Figure 1:
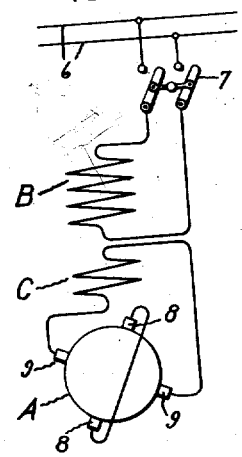

N. CURRIE, Jr.
WINDING FOR ELECTRIC MOTORS.
APPLICATION FILED MAR. 4, 1916.

1,257,193.

Patented Feb. 19, 1918.

Inventor:
Neil Currie Jr.,
by Albert G. Davis
His Attorney.

UNITED STATES PATENT OFFICE.

NEIL CURRIE, JR., OF PITTSFIELD, MASSACHUSETTS, ASSIGNOR TO GENERAL ELECTRIC COMPANY, A CORPORATION OF NEW YORK.

WINDING FOR ELECTRIC MOTORS.

1,257,193.   Specification of Letters Patent.   Patented Feb. 19, 1918.

Application filed March 4, 1916. Serial No. 82,098.

*To all whom it may concern:*

Be it known that I, NEIL CURRIE, Jr., a citizen of the United States, residing at Pittsfield, county of Berkshire, State of Massachusetts, have invented certain new and useful Improvements in Windings for Electric Motors, of which the following is a specification.

My invention relates to electric motors, and has for its object the provision of an improved winding for such motors. The invention more particularly relates to electric motors having two separate windings, which I will call field windings, arranged on one member of the motor, usually the stator member. Alternating current motors of the compensated repulsion-induction motor type are examples of such motors. With respect to motors of this type the object of my invention is to provide a novel and improved arrangement of the two field windings. More specifically the object of my invention is to provide a distributed motor winding composed of substantially uniform coils wound of a continuous conductor and assembled as a lap winding. The invention in its complete aspect will be better understood by considering a motor having two separate windings on its stator, and to this end I will herein particularly refer to the compensated repulsion-induction motor for the purpose of explaining the principle of my invention.

The compensated repulsion-induction motor has an inducing winding usually arranged on its stator member and designed to be electrically connected to the source of alternating current energy. The armature or induced winding is a commutated winding of the direct current type and is short-circuited along one axis and electrically connected along another axis, displaced by substantially 90 electrical degrees from the short-circuited axis, to a compensating winding arranged on the same member of the motor as the inducing winding and having substantially the same axis of magnetization. In accordance with my present invention the inducing winding of this motor is composed of coils of substantially uniform pitch wound of a continuous conductor. Some of the coils have substantially twice as many turns as the others, and the larger coils are assembled as a one-layer lap winding and the smaller coils as a two-layer lap winding and so that a plurality of slots are only partly filled by the smaller coils, whereby the coils of the compensating winding can be accommodated in such partly-filled slots.

While my invention in its complete aspect relates to a motor having two windings, arranged for example on the stator, still the principle of the invention can be very advantageously applied to a single distributed winding, and in particular to the field winding of alternating current motors, especially of the repulsion motor type. As applied to such a motor the improved winding of my present invention is a lap winding composed of coils of substantially uniform pitch, all of which are wound of a continuous conductor. Certain of the coils have substantially twice as many turns as the others and are assembled as a one-layer lap winding, while the half-size coils are assembled as a two-layer winding.

Figure 2:
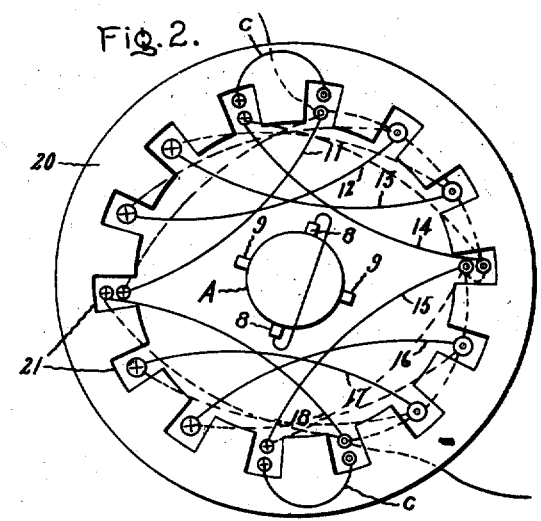
Figure 3:
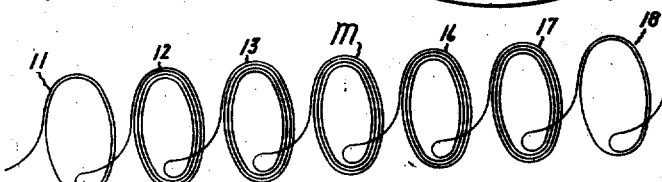
Figure 4:
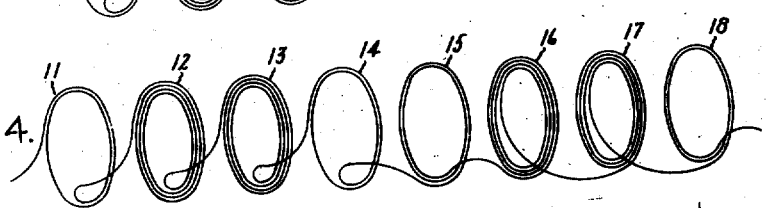
Figure 5:
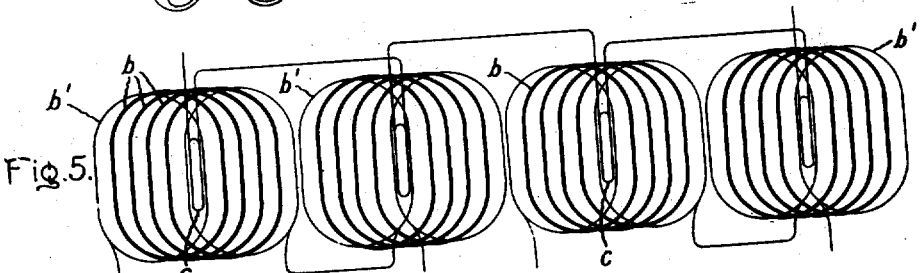
Figure 6:
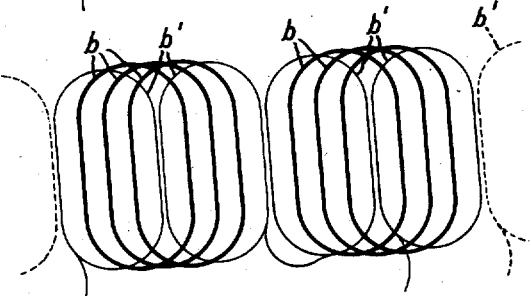

The novel features of my invention which I believe to be patentable are definitely indicated in the claims appended hereto. The arrangement and advantages of my improved winding and the method of winding and assembling the same will be better understood from the following description taken in conjunction with the accompanying drawings, in which;

Figure 1 diagrammatically represents a typical repulsion-induction motor to which my invention is particularly applicable; Fig. 2 is a diagrammatic end view of a motor of the type represented in Fig. 1 embodying the invention; Figs. 3 and 4 are diagrammatic views of the inducing winding of the motor illustrated in Fig. 2 before the winding is assembled; and Figs. 5 and 6 are diagrammatic views illustrating other embodiments of the invention.

Fig. 1 diagrammatically illustrates a two-pole repulsion-induction motor of a well-known type. This motor has a commutated armature winding of the direct current type diagrammatically represented in Fig. 1 by the circle A. The main field or inducing winding B of the motor is arranged on the stator core and is adapted to be connected to a source of alternating current energy 6 by means of a switch 7. A compensating winding C having substantially the same axis of magnetization as the inducing winding B is also arranged on the stator core. The armature winding is short-circuited by working or energy brushes 8—8 and is electrically connected by compensating or exciting brushes 9—9 to the terminals of the compensating windings C. Preferably, the axis of the energy brushes 8—8 is displaced from the axis of magnetization of the inducing winding in order to provide a sufficient starting torque, as is well understood in the art. The compensating brushes 9—9 are displaced substantially 90 electrical degrees from the brushes 8—8, and all of these brushes may be mounted on the same brush yoke which may if desired be movable as in the well known brush-lifting motors of this type. Numerous other operatively equivalent arrangements of the commutator brushes are known and used, and I have illustrated one particular arrangement for the purpose of explanation.

Fig. 2 is a diagrammatic end view of a compensated repulsion-induction motor of the type represented by Fig. 1 embodying my present invention. The motor has a laminated magnetic core or stator member 20 having uniformly distributed slots 21 of substantially the same size. The inducing and compensating windings B and C are arranged in the slots 21. The inducing winding B is composed of a plurality of coils of substantially uniform pitch, certain of which coils, however, have substantially twice as many turns as the others. In the two-pole machine represented in Fig. 2, the inducing winding B is made up of eight coils, four of which, 12, 13, 16 and 17, have twice as many turns as the other four, 11, 14, 15 and 18. These coils are arranged in the slots 21 as a lap winding, and it will be observed that the larger coils, 12, 13, 16 and 17, are arranged as a one-layer lap winding while the one-half size coils, 11, 14, 15 and 18 are arranged as a two-layer lap winding. Current distribution in the slot part of the conductors of these coils is shown in this figure by means of the usual convention, in which crosses and circles applied to the conductors indicate, respectively, that the current is flowing away from or toward the observer. The back connections of the coils including the connections from coil to coil are shown in dotted lines.

Fig. 3 illustrates one manner in which the coils of the inducing winding can be wound of a continuous conductor. Let it be assumed for the purposes of explanation that the coil 11 has ten turns. These ten turns are wound on a suitable form and tied together, then five coils of twenty turns each are wound and tied together, and finally the last coil 18 of ten turns is wound and tied, all without breaking the conductor. The middle coil $m$ of the twenty-turn coils is divided into two sections of ten turns each, thereby forming the two ten-turn coils 14 and 15. In this manner all eight coils are wound of a continuous conductor. Coils 15, 16, 17 and 18 are next turned over, as indicated in Fig. 4, so that the relative direction of current flow in these coils is opposite to that in the other four coils, and hence the two sets of coils when assembled produce poles of opposite magnetic polarity. The eight coils, wound and arranged as represented in Figs. 3 and 4, are assembled in the slots 21, as indicated in Fig. 2. It will be observed that every small coil 11, 14, 15 and 18 occupies one slot in conjunction with another small coil, while the other slot-portion of each small coil occupies a slot in conjunction with a coil $c$ of the compensating winding. In other words, when the inducing winding B has been assembled in the slots 21 of the two-pole motor of Fig. 2, there are two pairs of partly-filled slots in which the coils $c$ of the compensating winding are adapted to be placed. As previously stated, the larger coils are arranged as a one-layer lap winding and the smaller coils as a two-layer lap winding, and, accordingly, the smaller coils are positioned in different slots than the larger coils and so that a plurality of slots per pole are only partly filled by the smaller coils, whereby the compensating winding coils $c$ may be arranged in these partly-filled slots.

The inducing winding and compensating winding of a four-pole machine are diagrammatically represented in Fig. 5. The larger coils $b$, indicated in Fig. 5 by heavy lines, have substantially twice as many turns as the smaller coils $b'$, and are adapted to occupy uniformly distributed slots of substantially the same size in the field magnet core. As previously explained the interior small coils $b'$ can be initially wound with the same number of turns as the larger coils $b$ and subsequently divided into two equal portions and folded back to form two small coils. It will be observed that all of the coils $b$ and $b'$ have substantially the same pitch, just as in the two-pole winding hereinbefore described. The coils $c$ of the compensating winding occupy these slots only partly filled by the smaller coils $b'$.

In Fig. 6 of the drawings I have diagrammatically represented two poles of a winding wound of a continuous conductor as explained in connection with Figs. 3 and 4, which is adapted to be used as the inducing winding of a non-compensated repulsion motor. This winding is therefore designed to fill all of the slots in the magnetic core, and no auxiliary or compensating winding is associated therewith. To this end the slot-portion of every small coil $b'$ occupies a slot in conjunction with the slot-portion of another small coil. This results in 100 per cent. of the slots being filled with a single winding wound of a continuous conductor and composed of substantially uniform coils assembled as a lap winding. The larger coils *b* are arranged as a one-layer lap winding and the smaller coils *b'* are arranged as a two-layer lap winding, as will be clearly understood by those skilled in the art from an inspection of Fig. 6.

The improved motor winding of my present invention is inexpensive and easily assembled. Since the winding is continuous there are no coil end connections to be soldered, and the best possible electrical connections between coils are obtained. The coils are all of the same size and can be wound on the same bobbin, which is of particular advantage from a manufacturing standpoint. Furthermore, a lap winding is a very desirable type of motor winding, and my present invention not only enables the use of a lap winding, where heretofore concentric coils have been used, but also enables the use of a continuous conductor for this winding. While I have diagrammatically indicated in the accompanying drawings windings in which each pair of poles are made of a continuous conductor, I wish it to be understood that any other number of poles, more or less, may be wound of the same continuous conductor, and the number of poles which will in practice be wound of a continuous conductor will depend upon the facility with which the coils so wound can be handled and assembled.

What I claim as new and desire to secure by Letters Patent of the United States, is:—

1. An electric motor comprising a magnetic core having slots therein, and a winding arranged in said slots, said winding being composed of coils of substantially uniform pitch, some of which have substantially twice as many turns as the others, the larger of said coils being arranged as a one-layer lap winding and the smaller as a two-layer lap winding.

2. An electric motor comprising a magnetic core having slots therein, and a winding arranged in said slots, said winding being composed of coils of substantially uniform pitch, all of which are wound of a continuous conductor, certain of said coils having substantially twice as many turns as the others and being arranged in said slots as a one-layer lap winding while the smaller coils are arranged in said slots as a two-layer lap winding.

3. An alternating current motor comprising an inducing winding, and a commutated armature winding short-circuited along one axis, said inducing winding being composed of coils of substantially uniform pitch, some of which have substantially twice as many turns as the others, all of the coils of each pole of said winding being wound of a continuous conductor, the larger of said coils being arranged as a one-layer lap winding and the smaller as a two layer lap winding.

4. An alternating current motor comprising a magnetic core having slots therein, an inducing winding, and a commutated armature winding short-circuited along one axis, said inducing winding being composed of coils of substantially uniform pitch, all of which are wound of a continuous conductor, certain of said coils having substantially twice as many turns as the others and being arranged in said slots as a one-layer lap winding while the smaller coils are arranged in said slots as a two-layer lap winding.

5. An electric motor comprising a magnetic core having slots therein, and a winding arranged in such slots, said winding being composed of coils of substantially uniform pitch, all of the coils of each pole of said winding being wound of a continuous conductor, certain of said coils having substantially twice as many turns as the others and being arranged in said slots as a one-layer lap winding while the smaller coils are arranged in said slots as a two-layer winding.

6. An alternating current motor comprising an inducing winding, a commutated armature winding short-circuited along one axis, and a compensating winding electrically connected to the armature winding along an axis displaced by substantially 90 electrical degrees from the axis of said short-circuit, said inducing and compensating windings being arranged on the same member of the motor and having substantially the same axes of magnetization, said inducing winding being composed of coils of substantially uniform pitch, some of which have substantially twice as many turns as the others, the larger coils being arranged as a one-layer lap winding and the smaller coils being arranged as a two-layer lap winding.

7. An alternating current motor comprising a magnetic core having slots therein, an inducing winding, a commutated armature winding short-circuited along one axis, and a compensating winding electrically connected to the armature winding along an axis displaced by substantially 90 electrical degrees from the axis of said short-circuit, said inducing and compensating windings being arranged in the slots of said core and having substantially the same axes of magnetization, said inducing winding being composed of coils of substantially uniform pitch, some of which have substantially twice as many turns as the others, the larger of said coils being arranged as a one-layer lap winding and the smaller as a two-layer lap winding and so that a plurality of slots per pole are only partly filled, the coils of said compensating winding being arranged in said partly-filled slots.

8. An alternating current motor comprising a magnetic core having slots therein, an inducing winding arranged in said slots, a commutated induced winding, said inducing winding being composed of coils of substantially uniform pitch, some of which have substantially twice as many turns as the others, the larger of said coils being arranged as a one-layer lap winding and the smaller as a two-layer lap winding and so that a plurality of slots per pole are only partly filled, and a compensating winding arranged in said partly-filled slots and electrically connected to said induced winding.

9. An electric motor comprising a magnetic core having uniformly distributed slots of substantially the same size, a main field winding arranged in said slots, said main field winding being composed of coils of substantially uniform pitch, some of which have substantially twice as many turns as the others, the larger of said coils being arranged as a one-layer lap winding and the smaller as a two-layer lap winding and so that a plurality of slots are only partly filled, and an auxiliary field winding arranged in said partly-filled slots.

10. An electric motor comprising a magnetic core having slots therein, a main field winding arranged in said slots, said field winding being composed of coils of substantially uniform pitch and having a plurality of coils per pole with substantially one-half as many turns as the other coils, the smaller coils being arranged in different slots than the larger coils and so that a plurality of slots are only partly filled thereby, and an auxiliary field winding arranged in said partly-filled slots.

11. An electric motor comprising a magnetic core having slots therein, a main field winding arranged in said slots, said field winding being composed of coils of substantially uniform pitch, certain of said coils having substantially twice as many turns as the others and being arranged in said slots as a one-layer winding, the smaller coils being arranged in said slots as a two-layer winding and so that a plurality of slots are only partly filled thereby, and an auxiliary field winding arranged in said partly-filled slots.

12. An electric motor comprising a magnetic core having slots therein, a main field winding arranged in said slots, said field winding being composed of coils of substantially uniform pitch and having a plurality of coils per pole with substantially one-half as many turns as the other coils, the larger of said coils being arranged as a one-layer winding and the smaller as a two-layer winding, the smaller coils being accordingly arranged in different slots than the larger coils and so that a plurality of slots are only partly-filled thereby, and an auxiliary field winding arranged in said partly-filled slots.

13. An alternating current motor comprising a magnetic core having uniformly distributed slots of substantially the same size, an inducing winding arranged in said slots, said inducing winding being composed of coils of uniform pitch and having a plurality of coils per pole with substantially one-half as many turns as the other coils, the larger of said coils being arranged as a one-layer winding and the smaller as a two-layer winding, the smaller coils being further arranged so that a plurality of slots per pole are only partly filled thereby, a commutated armature winding short-circuited along one axis, and a compensating winding arranged in said partly filled slots and electrically connected to said armature winding.

In witness whereof, I have hereunto set my hand this 29th day of February, 1916.

NEIL CURRIE, Jr.